UNITED STATES PATENT OFFICE.

BOLESLAS ZAHORSKI, OF NEW YORK, N. Y.

METHOD OF PRODUCING CITRIC ACID.

1,066,358. Specification of Letters Patent. Patented July 1, 1913.

No Drawing. Application filed January 26, 1910. Serial No. 540,267.

*To all whom it may concern:*

Be it known that I, BOLESLAS ZAHORSKI, a citizen of the United States, residing at New York, in the county of New York and State of New York, have invented new and useful Improvements in Methods of Producing Citric Acid, of which the following is a specification.

This invention relates to a method of producing citric acid from saccharose, glucose, levulose and lactose by means of a certain well known fungus which is introduced into solutions of these substances containing certain necessary nutritive salts, and which during its growth converts the sugar into citric acid. It is a well known fact that the spores of certain fungi while developing have the power to convert the sugar into citric acid as above stated to a greater or less degree and applicant is aware that patents have been granted for methods of thus obtaining citric acid. In endeavoring to attain successful results I have discovered that the use of a fungus commonly known as *Sterigmatocystis nigra*, when employed in this fermentation produces excellent results.

In carrying out this invention a culture is produced by using a sugar solution to which is added about 10 to 15 per cent. of citric acid, and into this a small amount of the fungus is introduced and allowed to grow. The growth obtained in this solution serves as a stock culture. The amount of citric acid produced in the processes previously used is only 5% of the sugar used, and to increase the yield of citric acid it is necessary to obtain a growth of *Sterigmatocystis nigra* which can resist a much higher concentration of citric acid, say, up to about 15%. This I found could be done only gradually by cultivating each successive generation in a solution containing more citric acid, than the last one. The culture of acid resisting fungus is then used to inoculate a solution containing a small amount of citric acid, together with small amounts of nutrient salts, such as ammonium nitrate, potassium phosphate, magnesium sulfate; and the fermentation is allowed to proceed at a temperature between 10 to 30° C. until the formation of citric acid ceases, whereupon the citric acid is obtained from the solution in any approved manner.

By using a culture of the fungus which has this high acid resisting power, not only can a citric acid solution having a higher concentration be obtained, but also it is possible to convert a larger percentage of the sugar used into citric acid.

What I claim as new and desire to secure by Letters Patent is:

1. A process of converting sugar into citric acid, said process comprising the cultivation of a culture of fungus *Sterigmatocystis nigra* in a culture medium containing about 15% of citric acid, and thereafter inoculating a sugar solution with this culture, allowing the growth of the fungus to proceed in said solution to produce citric acid therein.

2. A process of converting sugar into citric acid, said process comprising the cultivation of a culture of fungus *Sterigmatocystis nigra* in a culture medium containing about 15% of citric acid, and thereafter inoculating a sugar solution containing small amounts of mineral salts, with this culture, allowing the growth of the fungus to proceed in said solution to produce citric acid therein.

3. A process of converting sugar into citric acid, said process comprising the cultivation of a culture of fungus *Sterigmatocystis nigra* in a culture medium containing about 15% of citric acid, and thereafter inoculating a sugar solution with this culture, allowing the growth of the fungus to proceed in said solution while the temperature of solution is maintained between the limits of 10° and 35° C., to produce citric acid therein.

4. A process of converting sugar into citric acid, said process comprising the cultivation of a culture of fungus *Sterigmatocystis nigra* in a culture medium having an acidity equivalent to about 15% of citric acid, and thereafter inoculating a sugar solution with this culture, allowing the growth of the fungus to proceed in said solution to produce citric acid therein.

In testimony whereof I affix my signature in presence of two witnesses.

BOLESLAS ZAHORSKI.

Witnesses:
 JAMES F. DUHAMEL,
 K. ALLEN.